United States Patent
Uchiyama et al.

(10) Patent No.: US 6,744,828 B1
(45) Date of Patent: Jun. 1, 2004

(54) RECEIVING APPARATUS

(75) Inventors: Kazuhiko Uchiyama, Saitama (JP); Sei Kato, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/577,360

(22) Filed: May 23, 2000

(30) Foreign Application Priority Data

May 27, 1999 (JP) ........................................ P.11-148609

(51) Int. Cl.[7] .............................................. H04L 27/16
(52) U.S. Cl. ...................... 375/326; 375/342; 375/344; 375/362; 455/67.3; 455/182.2; 455/192.2; 455/208
(58) Field of Search ................................ 375/260, 261, 375/285, 324, 326, 327, 342, 340, 344, 346, 362, 364; 370/281, 295, 343, 344, 430, 436, 437; 329/302, 306, 307, 318, 319, 321, 323–325, 346, 349, 354, 358–360; 455/43, 45, 50.1, 67.1, 67.3, 75, 77, 147, 150.1, 154.1, 160.1, 161.1, 163.1, 164.1, 164.2, 165.1, 180.1, 180.3, 182.1–182.3, 184.1, 185.1, 186.1, 186.2, 190.1, 192.1–192.3, 202, 208, 226.1–226.3, 227, 231, 255–260, 296, 323, 337

(56) References Cited

U.S. PATENT DOCUMENTS 5,694,389 A * 12/1997 Seki et al. .................. 370/208
5,726,974 A * 3/1998 Kunieda et al. ............. 370/206
6,058,101 A * 5/2000 Huang et al. ................ 370/208
6,067,332 A * 5/2000 Taura et al. ................. 375/344
6,208,695 B1 * 3/2001 Klank et al. ................. 375/260
6,408,038 B1 * 6/2002 Takeuchi ..................... 375/341

FOREIGN PATENT DOCUMENTS

| EP | 0 772 329 | 5/1997 |
| EP | 0 998 085 | 5/2000 |
| FR | 2 768 278 | 3/1999 |
| GB | 2 334 836 | 9/1999 |
| WO | WO 96/00472 | 1/1996 |

* cited by examiner

Primary Examiner—Stephen Chin
Assistant Examiner—Dac V. Ha
(74) Attorney, Agent, or Firm—Sughrue Mion, PLLC

(57) ABSTRACT

An intermediate frequency signal $S_{IF}$ is demodulated and the noise component contained in a null portion (no-signal portion) is detected as the noise component contained in a signal of the sub-carrier frequencies. The frequency $f_0$ of a reference frequency signal LO of a local oscillator 24 is feedback-controlled in accordance with the noise component thus detected. Further, the frequency $f_0$ of the reference frequency signal LO is feedback-controlled in accordance with an error rate detected by an error correction section 23. Thus, the sub-carriers within the intermediate frequency signal $S_{IF}$ subjected to the frequency conversion by a mixer 16 based on the reference frequency signal LO thus feedback-controlled is separated from the noise component on the frequency axis. The intermediate frequency signal $S_{IF}$ is subjected to the Fourier transformation by a digital mixer/FFT calculation section 21, so that the noise component can be suppressed.

3 Claims, 9 Drawing Sheets

(FIGURE SHOWING THE FORMAT OF DAB TRANSMISSION SIGNAL)

FIG. 10

| Δf (Hz) | APPLIED VOLTAGE (V) |
|---|---|
| +500 | 2.501667 |
| ⋮ | ⋮ |
| +20 | 2.500067 |
| +10 | 2.500033 |
| 0 | 2.500000 |
| -10 | 2.499967 |
| -20 | 2.499933 |
| ⋮ | ⋮ |
| -500 | 2.498333 |

RECEIVING APPARATUS

BACKGROUND OF THE INVENTION

The present invention relates to a receiving apparatus which receives an OFDM (Orthogonal Frequency Division Multiplex) modulated signal and, in particular, relates to a receiving apparatus which suppresses the influence due to noise components contained in the receiving signal to improve a carrier to noise ratio (CN ratio).

In the communication field such as the mobile communication etc., the OFDM modulation system is applied which multiplexes the transmission information by the frequency division to make it possible to transmit the information with high quality and at a high frequency utilizing efficiency.

Conventionally, the arrangement shown in FIG. 11 is known as an OFDM receiving apparatus which receives the modulated signal according to the OFDM modulation system. In the figure, an antenna 1 receives an OFDM modulated radio signal. The high frequency signal thus received is frequency converted into an intermediate frequency signal IF by a front end including a high frequency amplifier 2, a mixer 3 and a local oscillator 10. Further, the intermediate frequency signal IF is passed through a band pass filter 4 and amplified by an intermediate frequency amplifier 5 to a level capable of being signal processed. The signal thus amplified is supplied to a demodulating section formed by an analog-to-digital (A/D) converter 6, a demodulator 7, an OFDM demodulator 8 and a frame synchronous detector 12.

An oscillator 11 is controlled by a system controller 13 in a manner that it generates predetermined timing clocks and supplies these clocks to the A/D converter 6, the demodulator 7 and the OFDM demodulator 8.

The A/D converter 6 converts the aforesaid intermediate frequency signal IF into a digital signal on the basis of the timing clocks from the oscillator 11 and supplies the digital signal to the demodulator 7. The demodulator 7 detects the intermediate frequency signal IF in synchronism with the timing clocks from the oscillator 11 to generate an in-phase component signal (I component signal) and a quadrature component signal (Q component signal) as a base band signal.

The frame synchronous detector 12 detects the frame synchronous signal from the signal IF having been A/D converted by the A/D converter 6 to make the OFDM demodulator 8 perform the demodulating process on the basis of the timing clocks from the oscillator 11. The demodulator 7 supplies the I component signal and the Q component signal to the OFDM demodulator 8.

Then, the OFDM demodulator 8 subjects the I component signal and the Q component signal to the fast Fourier transformation (FFT) process at the predetermined timings synchronous with the frame synchronous signal and further to the differential demodulation process thereby to generate a demodulated signal and outputs the signal.

Although not shown, the demodulated signal is subjected to the error correction process and the decoding process, and the decoded signal is outputted to a signal processing circuit 9. The signal processing circuit 9 subjects the compressed signal contained in the decoded signal to the expansion process etc. to convert into an original audio band signal etc. and then outputs to a speaker etc.

In the aforesaid conventional OFDM receiving apparatus, in order to suppress the influence due to external noises or internal noises mixed in the intermediate frequency signal IF generated by the mixer 3 thereby to generate the demodulated signal with high quality, the method of removing such noises by using the band pass filter 4 is employed.

However, in order to remove the noise component from the OFDM modulated signal which is formed by multiplexing multiplicity of sub-carriers by the frequency division thereby to distinguish only the signal component of the respective sub-carrier frequencies, it is necessary to provide a band pass filter having a narrow pass frequency band and a high Q at every sub-carrier frequency. Such provision of the band pass filters results in the technical difficulty and is a cause for preventing the improvement of noise suppressing effect.

For example, when the frequency interval of the respective sub-carriers (the frequency between the adjacent channels) is a small value of about. 1 KHz, a band pass filter with quite steep frequency discrimination characteristics is required. Thus, since the noise suppressing effect depends on the variance etc. of the frequency characteristics of the band pass filter 4, there arises a problem that sufficient noise suppression effect can not be obtained and the cost becomes expensive.

SUMMARY OF THE INVENTION

Accordingly, the present invention has been made so as to obviate the aforesaid problems of the prior art, and an object of the present invention is to provide a receiving apparatus which can suppress the influence due to noises contained in a receiving signal thereby to improve a carrier to noise ratio (CN ratio).

In order to attain the aforesaid object, the invention is arranged in a manner that in a receiving apparatus for receiving an OFDM signal which is transmitted in a form of a frame having a no-signal portion and a data portion subjected to OFDM modulation by a plurality of sub-carriers, the receiving apparatus includes frequency conversion section for converting a tuning signal into an intermediate frequency signal;

noise detection section for detecting a noise component contained in the no-signal portion as a noise component contained in a signal of the sub-carrier frequencies; and frequency deviation section for deviating the intermediate frequency within an interval of the sub-carrier frequencies in accordance with the noise component contained in the no-signal portion detected by the noise detection section.

According to such an arrangement, the frequency of the tuning signal (reference frequency signal) used at the time of frequency-converting the received OFDM modulation signal into the intermediate signal is finely adjusted within the interval of the sub-carrier frequencies. This fine adjustment of the frequency is performed in accordance with the noise component of the no-signal portion contained in the OFDM signal, for example. In other words, the frequency of the tuning signal is feedback-controlled in accordance with the noise component. When the frequency conversion is performed based on the tuning signal thus finely adjusted, the sub-carriers in the intermediate frequency signal are separated from the noise component on the frequency axis. Further, when the intermediate frequency signal where the sub-carriers and the noise component are separated is subjected to the Fourier transformation for the demodulation, the noise component can be suppressed. As a result, the CN ratio can be improved and the signal can be received with high quality.

Further, the invention is arranged in a manner that the receiving apparatus further includes error rate detection section for detecting an error rate at a time of decoding data contained in the data portion, wherein the frequency deviation section deviates the intermediate frequency within the interval of the sub-carrier frequencies in accordance with the noise component contained in the no-signal portion detected by the noise detection section and the error rate thus detected.

According to such an arrangement, when the error rate of the signal to be actually demodulated and decoded becomes large, the frequency of the tuning signal is finely adjusted in accordance with the error rate. Like the aforesaid manner, when the frequency conversion is performed based on the tuning signal thus finely adjusted, the sub-carriers in the intermediate frequency signal are separated from the noise component on the frequency axis. Further, when the intermediate frequency signal where the sub-carriers and the noise component are separated is subjected to the Fourier transformation for the demodulation, the noise component can be suppressed. As a result, the CN ratio can be improved and the signal can be received with high quality.

BRIEF DESCRIPTION OF THE DRAWINGS

FIG. 10 is a diagram for explaining the correspondence relation between frequency deviation and a voltage applied to a voltage controlled crystal oscillator.

DETAILED DESCRIPTION OF THE PREFERRABLE EMBODIMENTS

Figure 1:
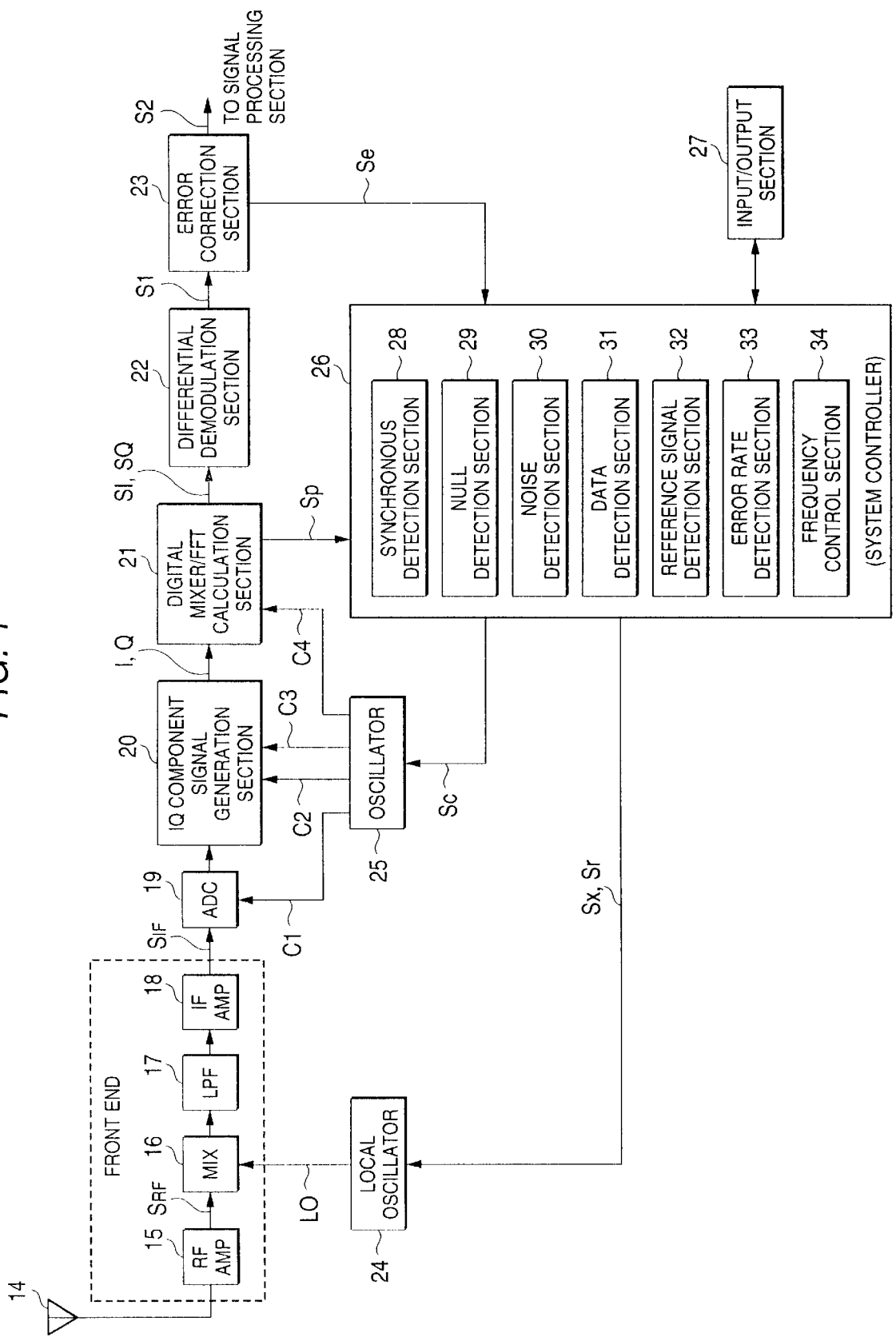
FIG. 1 is a block diagram showing the arrangement of a receiving apparatus according to an embodiment of the invention.
Figure 2:
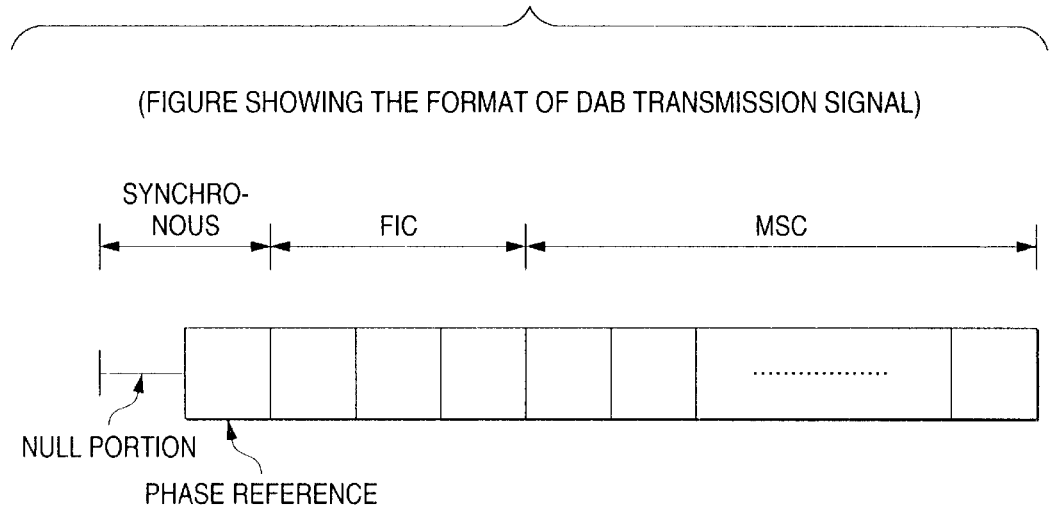
FIG. 2 is a diagram for explaining a frame format of a DAB transmission signal.

An embodiment of the present invention will be explained with reference to the accompanying drawings. FIG. 1 is a block diagram showing the arrangement of an OFDM receiving apparatus according to the embodiment. FIG. 2 is a diagram for explaining the frame format of a digital audio broadcasting (DAB) transmission signal in a DAB system to which the OFDM receiving apparatus of the invention can be applied.

The frame format of the DAB transmission signal will be explained with reference to FIG. 2. The DAB transmission signal is formed by a frame having a synchronous channel, a fast information channel (FIC) succeeding thereto and a main service channel (MSC). The synchronous channel is formed by a null symbol having no signal and not being modulated, and a phase reference symbol including a reference signal as a phase reference for demodulation. The FIC channel is allotted mainly for the control data transmission. The MSC channel is allotted mainly for the transfer of main data such as audio data etc., for example.

The DAB defines three transmission modes, that is, the mode 1 (for single frequency network) having the tuning frequency of 1.5 GHz band and the frequency interval of the carrier wave of 1 KHz, the mode 2 (for the ground broadcasting) having the tuning frequency of 39 MHz band and the frequency interval of the carrier wave of 4 KHz, the mode 3 (for the satellite broadcasting) having the tuning frequency of 200 MHz band and the frequency interval of the carrier wave of 8 KHz.

The configuration of the OFDM receiving apparatus will be explained with reference to FIG. 1. The OFDM receiving apparatus is provided with a front end section which mixes a received signal obtained by receiving the DAB transmission signal by a receiving antenna 14 with a reference frequency signal LO from a local oscillator 24 thereby to frequency convert the received signal into an intermediate frequency signal $S_{IF}$.

The front end section is formed by a high frequency amplifier 15 which high-frequency amplifies the received signal, a mixer 16 which mixes a received signal $S_{RF}$ amplified by the high frequency amplifier 15 with the reference frequency signal LO thereby to frequency convert the received signal into an intermediate frequency signal, a band pass filter 17 which passes only the transmission band component (the frequency band component including all the sub-carriers) of the intermediate frequency signal, and an intermediate frequency amplifier 18 which amplifies the signal passed through the band pass filter 17 to a predetermined level suitable for the detection. The intermediate frequency amplifier 18 outputs the intermediate frequency signal $S_{IF}$.

That is, when the center frequency of the received signal $S_{RF}$ is f and the frequency of the reference frequency signal LO is $f_0$, the signal $S_{IF}$ having an intermediate frequency $f_{IF}$ which is the absolute value $|f_0-f|$ of the difference between these frequencies is generated.

To be more concrete, the frequency $f_0$ of the reference frequency signal LO is set to the frequency of (the tuning frequency+the intermediate frequency) when receiving the mode 3 of the DAB, and set to the frequency of (the tuning frequency—the intermediate frequency) when receiving the mode 1 or 2. To be more in detail, the intermediate frequency $f_{IF}$ is set to 2.048 MHz or 3.072 MHz.

Further, the OFDM receiving apparatus is arranged to include an A/D converter 19, an IQ component signal generation section 20, a digital mixer/FFT calculation section 21, a differential demodulation section 22, an error correction section 23, an oscillator 25, a system controller 26 and an input/output section 27. The IQ component signal generation section 20, the digital mixer/FFT calculation section 21, the differential demodulation section 22, the error correction section 23 and the system controller 26 are formed by a digital signal processor (DSP).

The oscillator 25 generates synchronous clock signals C1 to C4 respectively having predetermined frequencies in accordance with a control signal Sc from the system controller 26.

The A/D converter 19 converts the intermediate frequency signal $S_{IF}$ into the digital signal in synchronism with the clock signal C1 and outputs the digital signal. In this embodiment, the sampling frequency of the clock signal C1 is set to 8.192 MHz or 4.096 MHz.

The IQ component signal generation section 20 detects an in-phase component signal I and a quadrature component signal Q as a base band signal from the digital signal thus converted on the basis of the clock signal C2 (having the frequency of 4.096 MHz, for example), then separates these, detected signals from the digital signal and outputs these signals thus separated.

The digital mixer/FFT calculation section 21 subjects the in-phase component signal I and the quadrature component signal Q to the digital mixing process with the clock signal C4 of the local frequency synchronizing with the clock signal C1, then subjects the signal obtained from the mixing process to the fast Fourier transformation (FFT) process in synchronous with the clock signal C4 thereby to obtain signals $S_I$, $S_Q$ on the frequency axis and outputs these signals. Further, the digital mixer/FFT calculation section supplies the signal obtained by the FFT process containing the signals $S_I$, $S_Q$ to the system controller 26. In this respect, the FFT process is performed within one symbol in order to demodulate all data of the FIC channel and the MSC channel shown in FIG. 2.

The differential demodulation section 22 subjects the signals $S_I$, $S_Q$ to the differential demodulation thereby to generate and output a demodulated signal S1 as the demodulated output.

The error correction section 23 subjects the demodulated signal S1 to the decoding process as well as the cancellation of the time interleave and the error correction process etc., to obtain a decoded signal S2 and outputs the decoded signal S2 to various kinds of signal processing sections, for example, a signal processing section etc. for subjecting the compressed signal contained in the decoded signal S2 to the expansion processing. In this respect, the Viterbi decoding method is used for the decoding. The error correction section supplies data Se representing an error rate (bit error rate) detected by the aforesaid error correction to the system controller 26.

The system controller 26 controls, based on tuning information designated by a user through the input/output section 27, the local oscillator 24 so as to set the frequency $f_0$ of the reference frequency signal LO thereof and the input/output section 27 so as to display various kinds of information such as a receiving channel etc. on a display section provided therein.

The system controller 26 is provided with a synchronous detection section 28 and a null detection section 29 which are operated by executing system program set in advance, a noise detection section 30, a data detection section 31, a reference signal detection section 32, an error rate detection section 33 and a frequency control section 34. Further, the system controller is provided with a not-shown memory (storage section) for storing various kinds of data generated at the time of executing the system program.

The null detection section 29 compares an amplitude value of a signal Sp outputted from the digital mixer/FFT calculation section 21 with a predetermined determination reference level and detects a portion of the signal smaller than the determination reference level as the null symbol shown in FIG. 2. To be more concrete, a portion of the sum of the square of the I component signal and the square of the Q component signal, that is, $(I^2+Q^2)$ smaller than the determination reference level is determined as the null symbol.

The synchronous detection section 28 generates the frame synchronous signal based on the null symbol detected by the null detection section 29.

The noise detection section 30 detects the sum $(I^2+Q^2)$ of the square of the I component signal and the square of the Q component signal as the power of the noise component mixed in the respective sub-carriers.

The data detection section 31 and the reference signal detection section 32 detect FIC section and the MSC section shown in FIG. 2 in accordance with the timing of the frame synchronous signal detected by the synchronous detection section 28 and control the decoding process in the differential demodulation section 22 based on the detection result.

The error rate detection section 33 compares the error rate data Se supplied from the error correction section 23 with a determination criterion. The error rate detection section determines that the receiving circumstance should be improved when a value of the error rate data Se is larger than the determination criterion ϵ.

The frequency control section 34 controls the frequency $f_0$ of the reference frequency signal LO so as to be set to a tunable frequency and automatically adjusts the respective synchronous clock signals C1 to C4 to the timings suitable for the demodulating process based on the tuning information designated by a user and the respective detection results of the synchronous detection section 28, the null detection section 29, the noise detection section 30, the data detection section 31, the reference signal detection section 32 and the error rate detection section 33.

In other words, the frequency control section supplies control signals Sx, Sr to the local oscillator 24 thereby to have the local oscillator generate the reference frequency signal LO corresponding to the tuned channel designated by a user and finely adjust the frequency $f_0$ of the reference frequency signal LO in accordance with the power of the noise component detected by the noise detection section 30 and the determination result of the error rate detection section 33.

Further, the frequency control section supplies a control signal Sc to the oscillator 25, which in turn generates the synchronous clock signals C1 to C4 synchronous with the intermediate frequency signal $S_{IF}$ generated in accordance with the thus finely adjusted frequency $f_0$ of the reference frequency signal LO and automatically adjusts these clock signals to the timings suitable for the demodulating process.

Figure 3:
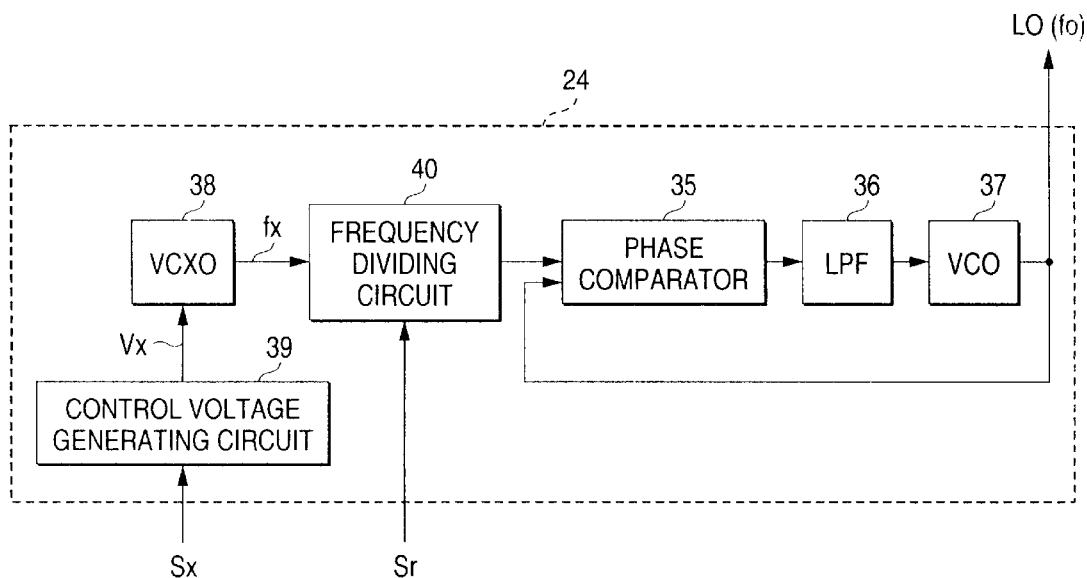
FIG. 3 is a block diagram showing the arrangement of a local oscillator.

The arrangement of the local oscillator 24 will be explained in detail with reference to FIGS. 3 and 4. In FIG. 3, the local oscillator 24 is formed by a phase locked loop (PLL) including a phase comparator 35, a low pass filter 36 and a voltage control oscillator (VCO) 37, a control voltage generation circuit 39 for generating a control voltage Vx designated by the control signal Sx and a voltage control X'tal oscillator 38 for oscillating with a frequency according to the control voltage Vx.

Figure 4:
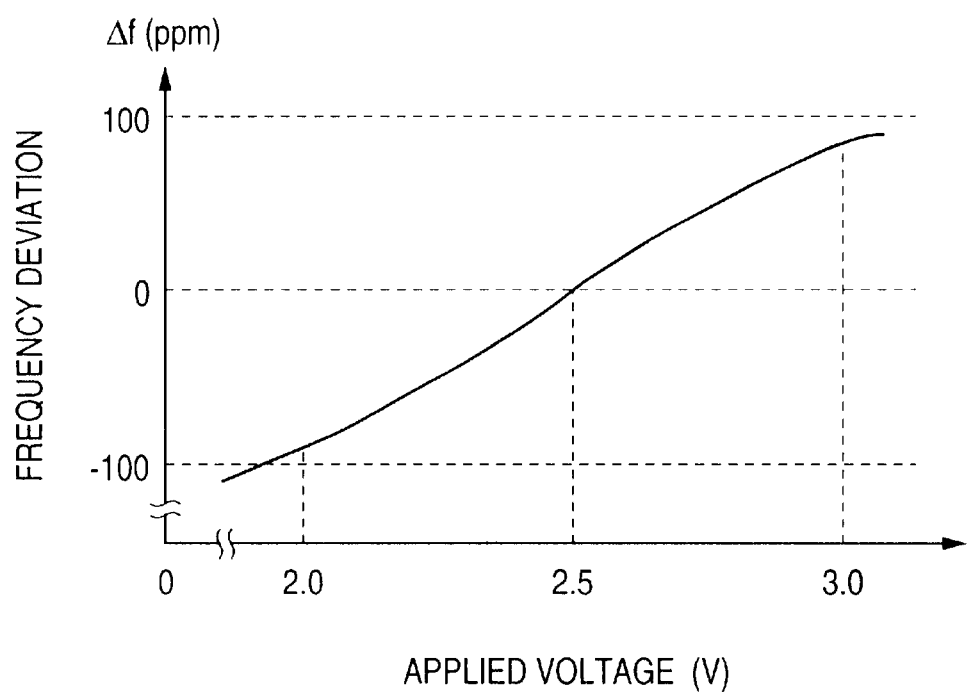
FIG. 4 is a characteristic diagram showing a voltage vs. frequency characteristic of a voltage controlled crystal oscillator.

The voltage control X'tal oscillator 38 has such a property that the oscillation frequency thereof changes in accordance with the voltage applied thereto, as shown in FIG. 4. For example, the oscillation frequency becomes 18.432 MHz when the control voltage Vx is set at 2.5 volt. When the control voltage Vx is changed within a range of ±0.5 volt with reference to this frequency and 2.5 volt, the frequency deviation Δf appears in a range of about ±100 ppm.

The applied voltages for obtaining desired frequency deviations Δf are stored as shown in FIG. 10. FIG. 10 shows an example of setting values of the applied voltage for deviating the frequency by Δf when the tuning frequency is at 1.5 GHz band and the intermediate frequency is 2.048 MHz. In this case, when the frequency deviation $\Delta f$ is 10 Hz, this frequency deviation $\Delta f$ corresponds to 0.0067 ppm of 1.5 GHz. According to the applied voltage vs. frequency deviation characteristics of the voltage control X'tal oscillator (VCXO) 38 shown in FIG. 4, supposing that the deviation of the applied voltage necessary for the frequency deviation of 1 ppm is 5 mV, an amount of change of the applied voltage necessary for the aforesaid frequency deviation $\Delta f$ of 10 Hz is 0.0067×5 mV=33 $\mu$V.

Since the control voltage Vx is set in accordance with the control signal Sx, the voltage control X'tal oscillator 38 generates a signal with a frequency fx which is proportional to the frequency f0 of the reference frequency signal LO to be finely adjusted. Further, since the frequency dividing ratio of a frequency dividing circuit 40 is set in accordance with the control signal Sr, the frequency dividing circuit subjects the frequency fx of the oscillation signal from the voltage control X'tal oscillator 38 to the frequency dividing process by the frequency dividing ratio corresponding to the tuned channel and supplies the frequency-divided signal to the PLL. Thus, the PLL generates the reference frequency signal LO with the frequency f0 which corresponds to a desired tuned channel and can be adjusted finely.

An example of the more detailed operation of the OFDM receiving apparatus thus configured will be explained with reference to the flow charts shown in FIGS. 5 and 6.

Figure 5:
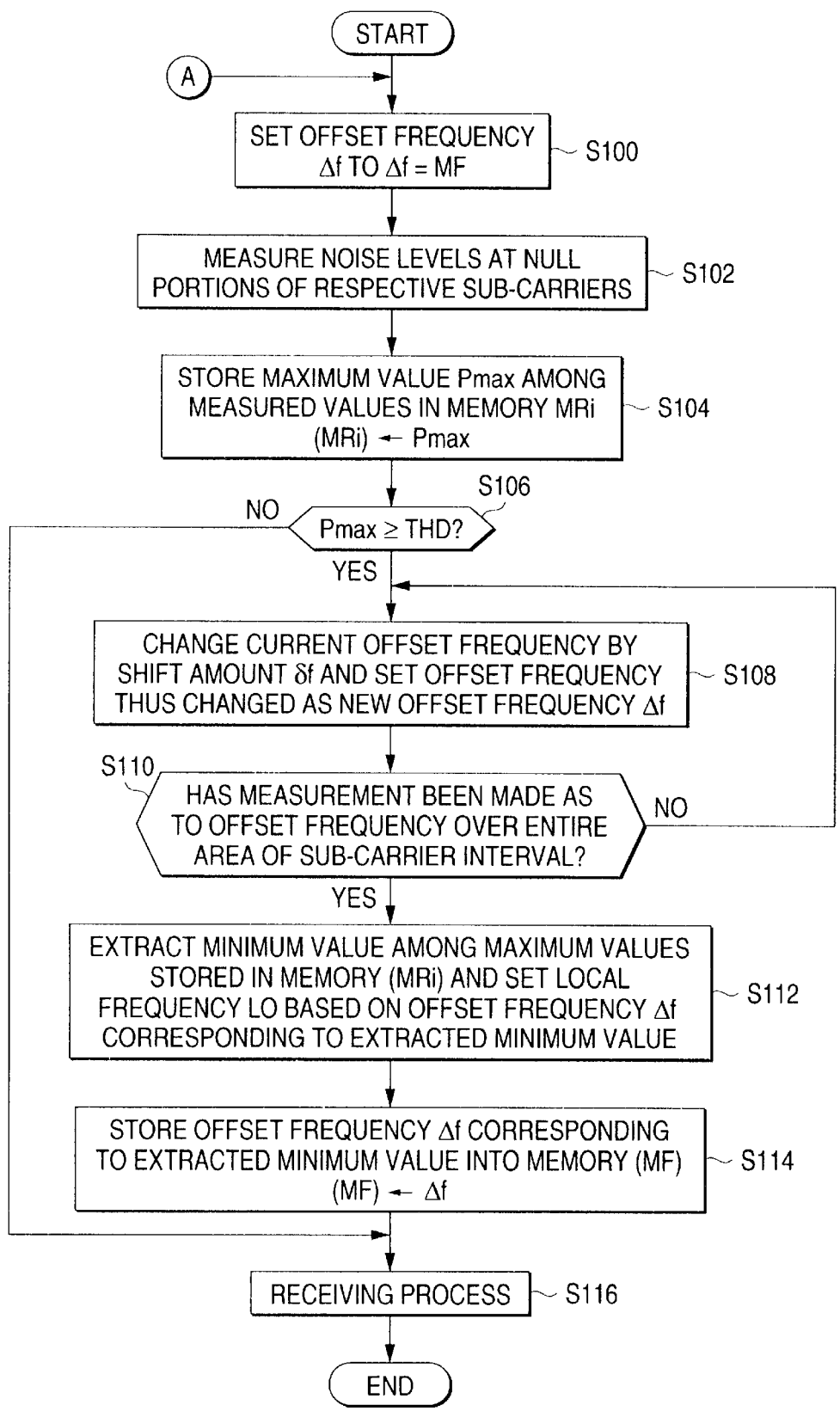
FIG. 5 is a flowchart for explaining an example of the operation of the receiving apparatus according to the embodiment and, mainly, an example of the operation of a frequency adjusting process.

In FIG. 5, when a tuned channel is instructed by a user, the control signals Sr, Sx for setting the reference frequency signal LO corresponding to the tuned channel are supplied to the local oscillator 24 and the receiving apparatus starts the receiving operation.

The control signal Sx represents an offset value MF stored in the memory area (MF). The offset value MF is a value of the frequency deviation (hereinafter called an offset frequency) $\Delta f$ stored as history information when the user performed the receiving operation of the same channel at the previous tuning operation. As the first operation of the receiving operation of this time, the offset value MF is checked in order to finely adjust the reference frequency signal LO based on the previous offset frequency $\Delta f$. In this respect, the offset value MF of the tuned channel to be received for the first time is initially set at 0.

Concretely, in step S100, when the offset value MF is 0, the offset frequency $\Delta f$ of the local oscillator 24 is set at 0 by the control signal Sx, so that the frequency $f_0$ of the reference frequency signal LO is not added with the offset frequency $\Delta f$ and hence set to the aforesaid standard local frequency of (the tuning frequency+the intermediate frequency) or (the tuning frequency–the intermediate frequency).

In contrast, when the offset value MF is not 0, the offset frequency $\Delta f$ of the local oscillator is set at MF, so that the frequency $f_0$ of the reference frequency signal LO is finely adjusted by adding the offset frequency $\Delta f$ obtained at the previous receiving operation thereto.

After setting the frequency $f_0$ of the reference frequency signal LO in this manner, the receiving operation is continued and the noise levels (power of the noise) at the null portions of the respective sub-carriers within the transmission band are measured (step 102). Then, the maximum value Pmax among the measured values of the respective noise levels is extracted and the maximum value Pmax is stored in the memory area (MRi) of the storage section in correspondence with the offset frequency $\Delta f$ (step S104). A symbol i depicts an address corresponding to the offset frequency $\Delta f$.

Then, the maximum value Pmax is compared with a predetermined threshold value THD (step S106). In this step, when it is determined that Pmax<THD (determination is "NO") it is determined that the receiving state is not influenced by noise, and the process proceeds to a step S116, whereat the normal receiving process is performed. In contrast, when it is determined that Pmax≧THD (determination is "YES"), the receiving process of step S116 is performed after executing the process of adjusting the offset frequency in steps S108 to S114.

In step S108, the local oscillator 24 is controlled by the control signal Sx thereby to change the offset frequency $\Delta f$ having been set therein by a predetermined shift amount $\delta f$ and set the offset frequency thus changed as a new offset frequency $\Delta f$. Further, a frequency obtained by shifting the standard local frequency by the new offset frequency $\Delta f$ is set as the frequency $f_0$ of the new reference frequency signal LO. The initial value of the offset frequency $\Delta f$ is set to 0.

Figure 7A:
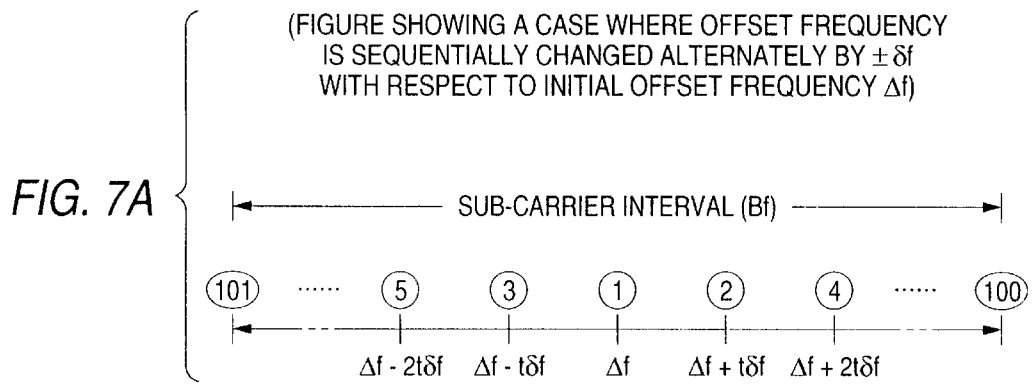
FIGS. 7A and 7B are diagrams for explaining a method of changing an offset frequency.

To be more concrete, when receiving the DAB transmission signal of the mode 1, the frequency (in this case 10 Hz) which is, for example, 1/100 of the frequency interval (sub-carrier interval) Bf=1 kHz of the carrier wave is set as the shift amount $\delta f$. Then, the frequency ($\Delta f+\delta f$) which is higher by $\delta f$ than the offset frequency $\Delta f$ having been set shown by a symbol ① in FIG. 7A is set as a new offset frequency $\Delta f$ shown by a symbol ②. Furthermore, the frequency $f_0$ of a new reference frequency signal LO is set based on the new offset frequency $\Delta f$ and the receiving process is continued.

After the frequency $f_0$ of the reference frequency signal LO is set in this manner, the receiving process is continued, and the noise levels (power of the noise) at the null portions of the respective sub-carriers within the transmission band are measured. Then, the maximum value Pmax among the measured values of the respective noise levels is extracted and the maximum value Pmax is stored in the memory area (MRi) of the storage section in correspondence with the offset frequency $\Delta f$. A symbol i depicts an address corresponding to the offset frequency $\Delta f$.

In the next step S110, it is determined whether the offset frequency $\Delta f$ has been changed based on the shift amount $\delta f$ over the entire area of the sub-carrier interval Bf. When it is determined "NO" in this step, the process returns to step S108 and the processes of steps S108 and S110 are repeated.

As described above, since the processes of steps S108 and S110 are repeated, as shown by the symbols ①②③④⑤ - - - in FIG. 7A, the signal is received in accordance with the respective reference frequency signals LO which are obtained by sequentially shifting the offset frequency by integer numbers of times of the shift amount $\delta f$ alternatively to the negative and positive directions. Then, the maximum noise power Pmax obtained at each time of shifting the offset frequency by the integer number of time of the shift amount $\delta f$ is stored in the memory area (MRi) in correspondence with the offset frequency $\Delta f$ at this time.

When it is confirmed in step S110 that the maximum noise powers Pmax have been measured in correspondence with all the offset frequencies $\Delta f$ over the entire area of the sub-carrier interval, the process returns to step S112, whereat the minimum noise power among all the maximum noise powers Pmax stored in the memory area (MRi) is extracted. In this case, when there are two or more minimum noise powers having the same value, one corresponding to the smallest offset value is extracted. Then, the frequency of the reference frequency signal LO is set again based on the offset frequency $\Delta f$ corresponding to the extracted minimum noise power. That is, the frequency of the reference frequency signal adjusted in this manner is the frequency capable of minimizing the influence due to the noise. The offset frequency Δf corresponding to the extracted minimum noise power is stored in the memory area (MF) (step S114) and the receiving process is performed in step S116.

Figure 8A:
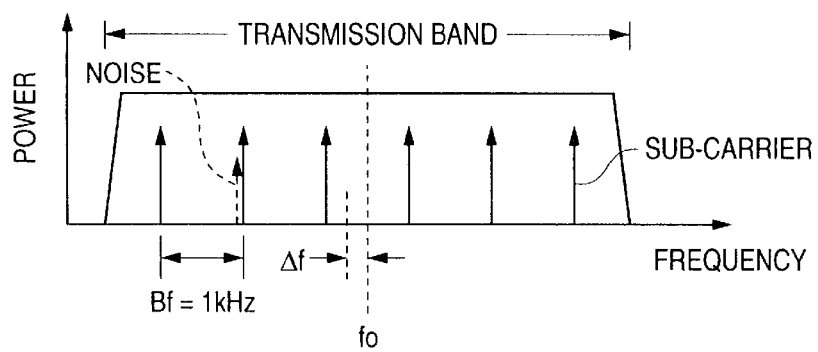
FIGS. 8A and 8B are diagrams for explaining a characteristic for separating noise from sub-carriers.
Figure 8B:
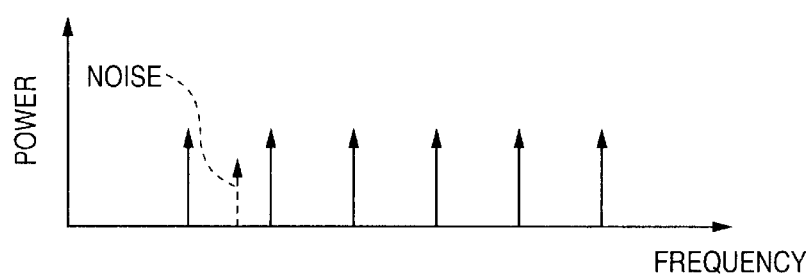
Figure 9A:
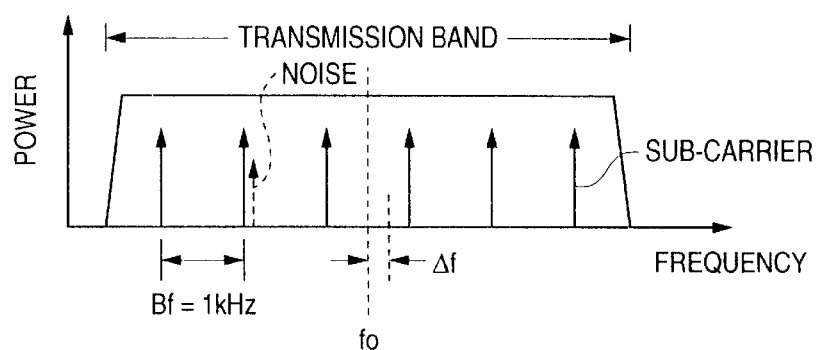
FIGS. 9A and 9B are diagrams for further explaining the characteristic for separating noise from the sub-carriers.
Figure 9B:
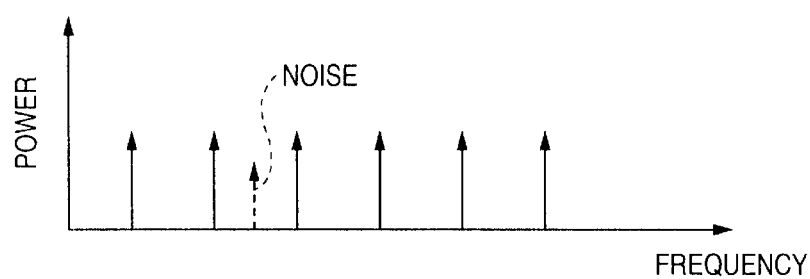

In this manner, since the frequency $f_0$ of the reference frequency signal LO is finely adjusted within the sub-carrier interval Bf, the signal can be received with high quality. That is, as shown in FIGS. 8A and 9A, when noise is mixed in the intermediate frequency signal $S_{IF}$, the respective sub-carriers within the intermediate frequency signal $S_{IF}$ subjected to the frequency conversion based on the adjusted reference frequency signal LO are shifted to the frequencies most away from the noise as shown in FIGS. 8B and 9B. In other words, the sub-carrier to be demodulated is separated from the frequency component of the noise.

The digital mixer/FFT calculation section 21 performs the FFT process in synchronism with the intermediate frequency signal $S_{IF}$ thereby to suppress the noise, so that the signals $S_I$, $S_Q$ of the in-phase component signal I and the quadrature component signal Q on the sub-carriers can be generated at high accuracy. As a result, the CN ratio can be improved and the signal can be received with high quality.

In the aforesaid explanation of the operation, although offset frequency Δf is changed alternately to the negative and positive directions as shown in FIG. 7A, the present invention is not limited to such a changing order of the offset frequency.

Figure 7B:
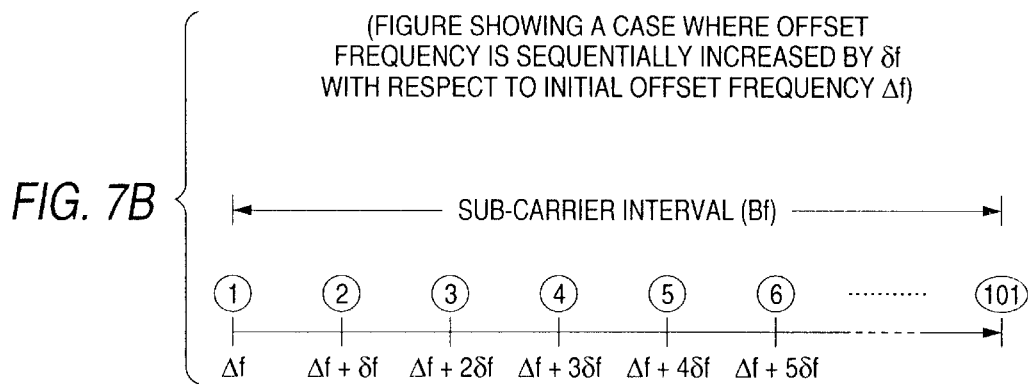

That is, as an example of the modification, as shown in FIG. 7B, the initial offset frequency Δf may be set at 0 Hz (see mark ①), and the offset frequency Δf may be sequentially increased by a predetermined shift amounts δf within the sub-carrier interval Bf (see marks ②③④ - - - ).

Alternatively, the initial offset frequency Δf I may be set at 1 Hz, and the offset frequency Δf may be sequentially decreased by a predetermined shift amounts f within the sub-carrier interval Bf.

In short, since it is merely required to change the offset frequency Δf within the sub-carrier interval Bf, the present invention is not limited to the aforesaid shifting orders of the offset frequency.

Figure 6:
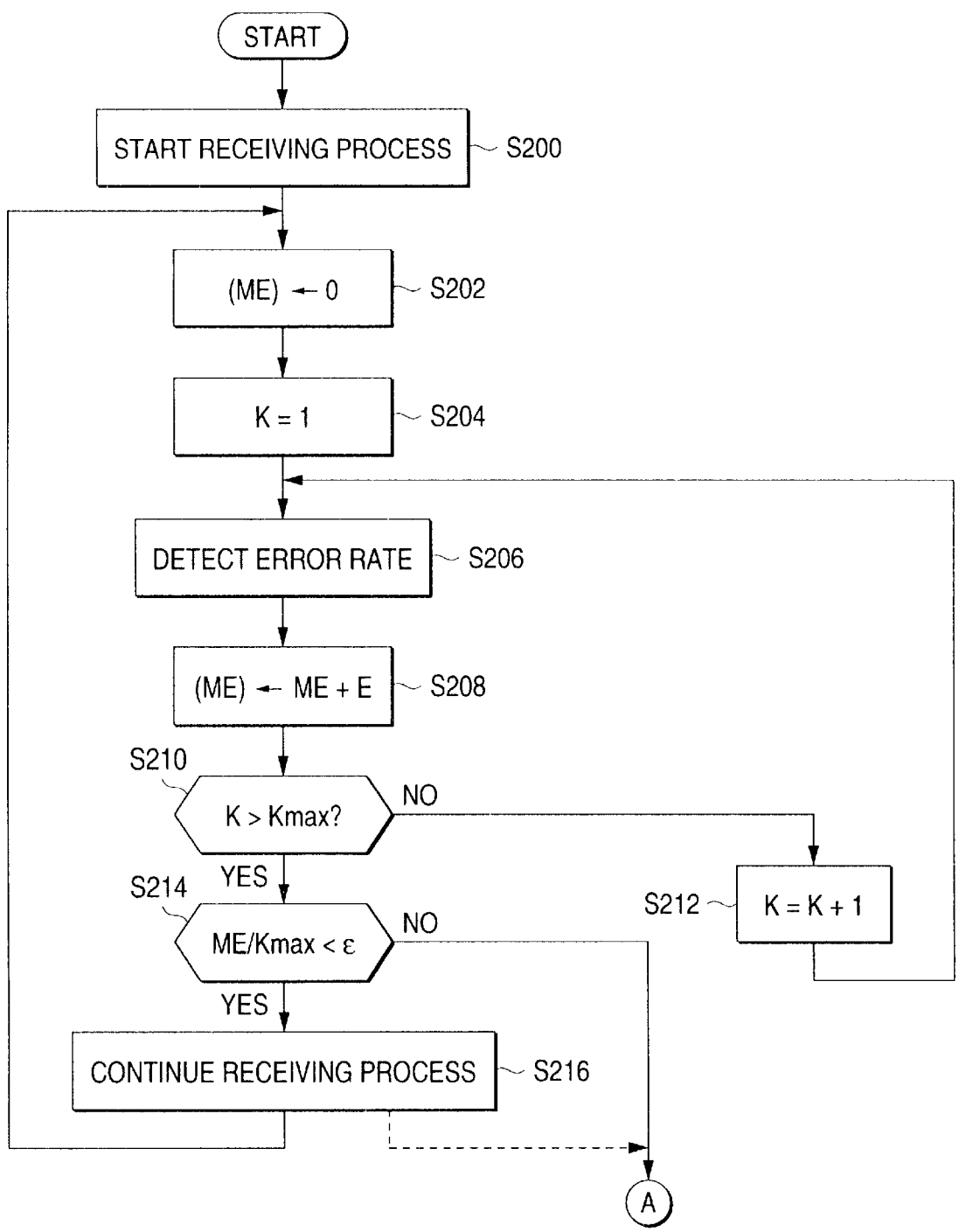
FIG. 6 is a flowchart for explaining an example of the operation of the receiving apparatus according to the embodiment and, mainly, an example of the operation of an error rate evaluating process.

Further, the invention makes it possible to receive the signal with high quality by the processing shown in FIG. 6. That is, when a user designates a tuned channel, the processing shown in FIG. 6 is started before executing the processing shown in FIG. 5 (step S200).

First, the error rate detection section 33 clears the memory area (ME) for storing the error rate data Se (step S202), then sets the count value K of a predetermined program counter to 1 (step S204), then in step S206 adds the error rate data Se transferred from the error correction section 23 to the value ME of the memory area (ME) and stores the result of the addition, that is, the sum in the memory area (ME) (step S208).

Next, it is determined whether the count value K reaches a value Kmax corresponding to a predetermined measuring time period (step S210). When it is determined that the count value does not reach the value (in the case of "NO"), the count value of the counter is incremented by one (step S212), and the processing of steps S206 to S210 is repeated until the condition K>Kmax is satisfied.

Then, the added value ME of the error rate thus stored in the memory area (ME) within the predetermined measuring time period is divided by the value Kmax corresponding to the predetermined measuring time period thereby to obtain a time average value (ME/Kmax) of the error rate, and the time average value of the error rate is compared with the determination criterion ε (step S214). When it is determined that the time average value of the error rate satisfies the condition of ME/Kmax<ε (in the case of "YES"), the determination is made that the signal can be received without being influenced by noise, and the receiving process is continued based on the reference frequency signal LO set at the standard local frequency (step S216). Then, the evaluation of the error rate is repeated in steps S202 to S214. In other words, the receiving operation is performed while evaluating the occurrence of the increase of the error rate at every lapse of the predetermined measuring time period.

In contrast, when it is determined in step S214 that the time average value of the error rate satisfies the condition of ME/Kmax≧ε (in the case of "NO"), the determination is made that the received signal is influenced by noise, then the process proceeds to step S100 of FIG. 5 and the aforesaid frequency adjusting process of the reference frequency signal LO is performed.

In this manner, since both the evaluation process of the error rate shown in FIG. 6 and the frequency adjusting process shown in FIG. 5 are employed, the signal can be received while suppressing the influence due to noise to a large extent.

As shown by a dotted line in FIG. 6, together with the continuation of the receiving process in step S216, the frequency adjusting process from step S100 may be started.

Further, the evaluating process of the error rate may be performed in the signal receiving process after the frequency adjusting process performed beforehand, or the error rate evaluating process and the frequency adjusting process may be combined in various manner. Further, the frequency adjusting process may be performed in accordance with the average value of the error rate detected by the error rate detection section 33.

Figure 11:
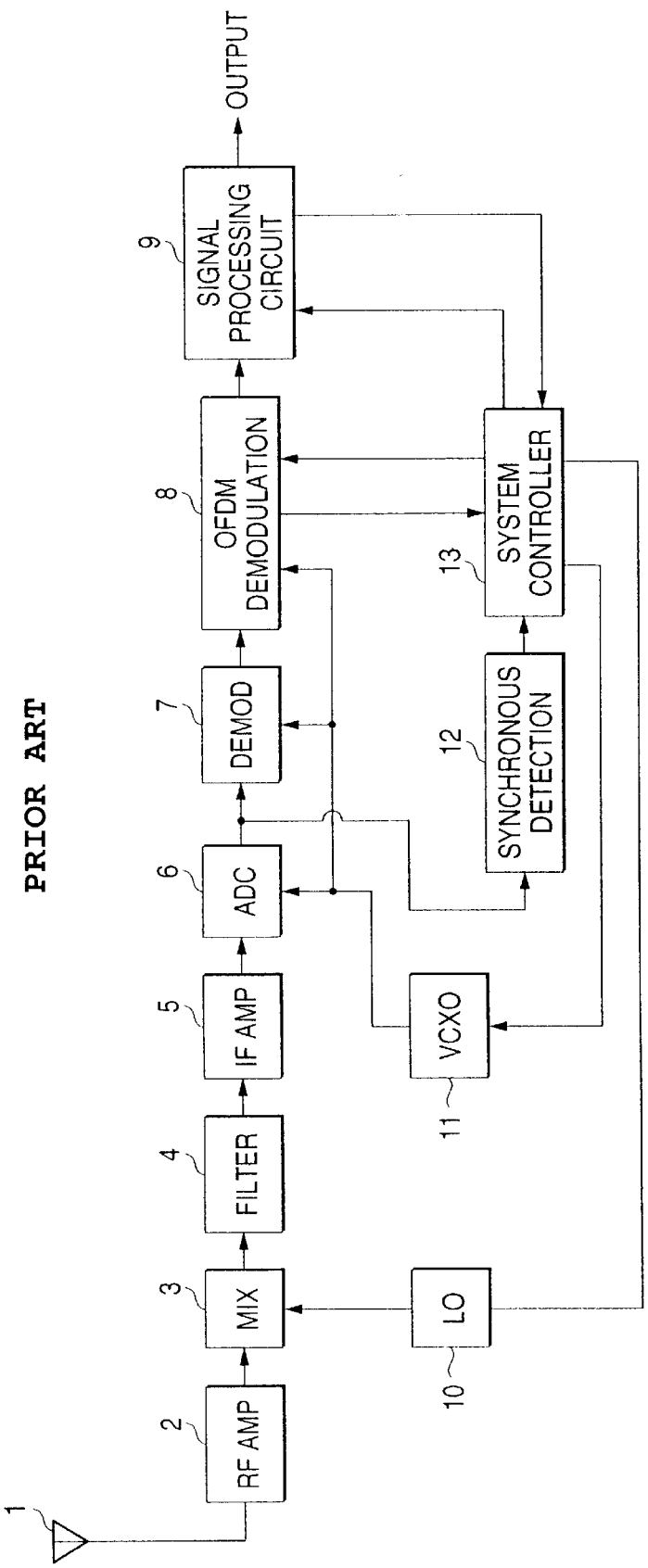
FIG. 11 is a block diagram showing the arrangement of a conventional receiving apparatus.

In this manner, unlike the conventional apparatus shown in FIG. 11 where the sub-carrier and the noise component contained in the intermediate frequency signal IF are distinguished to each other by using the band pass filter 4, according to the embodiment, since the frequency interval between the sub-carrier and the noise component is made larger by finely adjusting the frequency of the reference frequency signal LO shown in FIG. 1 and the noise component is suppressed through the FFT processing, the signal can be received with high quality.

To be more concrete, the invention intends to perform the demodulation process and the noise component suppression process simultaneously at the time of performing the FFT process. That is, the invention obtains the noise suppression effect by effectively utilizing such a feature that the OFDM modulation including the DAB is the discrete multi-carrier modulation. Thus, the invention does not require a particular noise removing circuit.

Further, the frequency of the reference frequency signal LO can be finely adjusted with high accuracy by utilizing the local oscillator 24 arranged as shown in FIG. 3. Thus, the frequency of the reference frequency signal LO can be adjusted with high accuracy to the frequencies capable of suppressing noise. Further, it becomes possible to miniaturize the receiving apparatus.

The arrangement of the local oscillator 24 shown in FIG. 3 is an example, and a similar oscillator capable of changing the frequency may be employed therefore.

As described above, according to the invention, the receiving apparatus is arranged in a manner that the noise component contained in the no-signal portion is detected as the noise component contained in the signal of the sub-carrier frequencies, and the intermediate frequency is deviated within the interval of the sub-carrier frequencies in accordance with the noise component contained in the no-signal portion. Thus, the sub-carriers in the intermediate frequency signal can be separated from the noise component on the frequency axis, and further the noise component can be suppressed when performing the Fourier transformation for the demodulation,. As a result, the CN ratio can be improved and the signal can be received with high quality.

Further, the invention is arranged in a manner that the receiving apparatus further includes error rate detection section for detecting an error rate at a time of decoding data, and the intermediate frequency is deviated within the interval of the sub-carrier frequencies in accordance with the noise component contained in the no-signal portion and the error rate. Thus, the sub-carriers in the intermediate frequency signal can be separated from the noise component on the frequency axis, and further the noise component can be suppressed when performing the Fourier transformation for the demodulation. As a result, the CN ratio can be improved and the signal can be received with high quality.

What is claimed is:

1. A receiving apparatus for receiving an OFDM signal which is transmitted in a form of a frame having a no-signal portion and a data portion subjected to OFDM modulation by a plurality of sub-carriers, said receiving apparatus comprising:
frequency conversion section for converting a tuned signal into an intermediate frequency signal;
noise detection section for detecting a noise component contained in said no-signal portion as a noise component contained in a signal of the sub-carrier frequencies; and
frequency deviation section for deviating the intermediate frequency within an interval of the sub-carrier frequencies in accordance with the noise component contained in said no-signal portion detected by said noise detection section; and
error rate detection section for detecting an error rate at a time of decoding data contained in said data portion, wherein
said frequency deviation section deviates the intermediate frequency within the interval of the sub-carrier frequencies in accordance with the noise component contained in said no-signal portion detected by said noise detection section and the error rate thus detected.

2. The receiving apparatus according to claim 1, wherein said frequency deviation section deviates the intermediate frequency within the interval of the sub-carrier frequencies in accordance with the noise component contained in said no-signal portion detected by said noise detection section, when the detected error rate exceeds a preset threshold value.

3. The receiving apparatus according to claims 1 or 2, further comprising:
storage section for storing history information of a frequency deviation value set by said frequency deviation section, wherein
said frequency deviation section sets the frequency deviation value stored in said storage section as an initial value, when a same channel is selected, and deviates the intermediate frequency within the interval of the sub-carrier frequencies with reference to the initial value.

* * * * *